Aug. 14, 1945.   E. B. WILLIAMS   2,382,687
HIGH PRESSURE BLOWER
Filed July 31, 1943   2 Sheets-Sheet 2

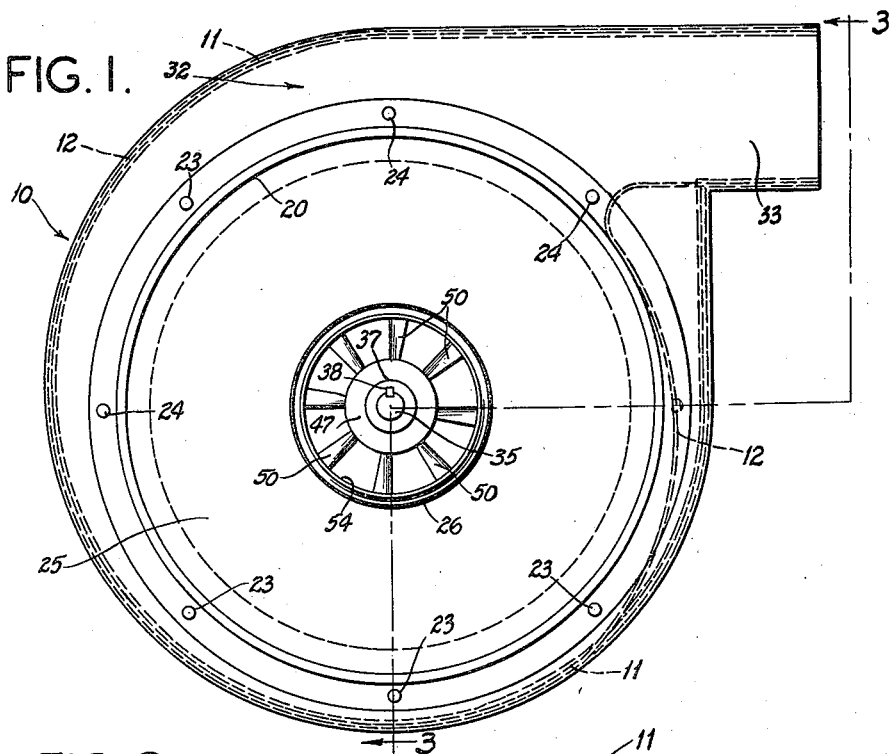
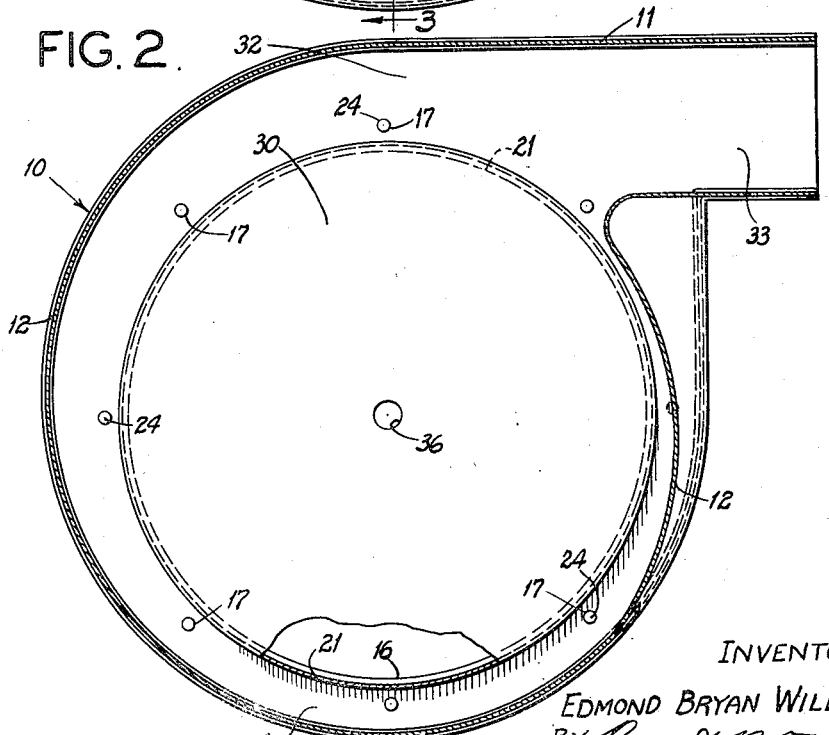

INVENTOR;
EDMOND BRYAN WILLIAMS
BY
ATTORNEY

Patented Aug. 14, 1945

2,382,687

UNITED STATES PATENT OFFICE 2,382,687

HIGH-PRESSURE BLOWER

Edmond Bryan Williams, Litchfield, Conn., assignor to The Torrington Manufacturing Company, Torrington, Conn., a corporation of Connecticut Application July 31, 1943, Serial No. 497,139

7 Claims. (Cl. 230—133)

This invention relates to improvements in high pressure blowers, and more particularly to a highly efficient, light weight and economically constructed centrifugal blower, particularly designed and adapted for certain uses in aircraft, but useful to care for a great variety of fluid displacement requirements.

Incident ot the application of centrifugal blowers to aircraft usage, there has arisen a need for a compact high-speed and high-delivery centrifugal blower wheel assembly, formed preferably throughout or at least in major part, of sheet metal, rather than of cast metal construction in the interest of minimization of weight. Many of the high-speed centrifugal blowers heretofore available for other purposes, are much too heavy in construction, and their operating characteristics such as to require complete redesign to adapt them to aircraft needs. It is accordingly a general and major objective of the present invention to meet the various requirements of a light weight, efficient blower assembly for the general field of usage noted.

Yet another important objective of the invention is attained in a blower assembly of the general type referred to, which is adaptable to a wide variety of aircraft duct connections, and in which, in keeping with this requirement and to enhance efficiency, provision is made for expansion of the air or other fluid from the wheel of the periphery, in important part in an axial direction, with or without provision also for radial expansion of a substantial proportion of the air delivered by the wheel.

A further object, akin to the foregoing, is found in an improved light weight and novel construction of blower housing, characterized by one or a pair of lateral insets enabling the use of a wheel which is relatively narrow in its axial dimension, in a blower housing which is of a considerably greater width, or axial dimension, at least in its discharge zone.

Yet another object, somewhat ancillary to the foregoing, is attained in the provision of a pair of lateral housing insets or inserts which are interchangeable, enabling the adaptation of a given group of assembly parts, to a wide variety of aircraft or other blower installations.

A still further important object of the invention is attained in certain features of improvement in blower wheel construction making for a more favorable air pickup by the wheel in its inlet zone; others tending toward a more favorable angle of delivery of the air discharged from the periphery of the wheel, and still other improved features making for a more rigid and more permanently aligned wheel of sheet metal or similar construction. These features are of particular value in maintaining the form of sheet metal wheels which are subjected, say, to substantial gyroscopic stresses due to banks and turns of high speed aircraft.

Still another important object is attained in a combination of certain features of novelty of wheel construction, and other features of novelty of housing construction which, when operatively combined, serve to enhance the performance of the assembly as compared with results attained when utilizing solely, either the features of wheel improvement or the novel design of housing.

The foregoing and numerous other objects will be more clearly apparent by making reference to the following detailed description of a preferred embodiment, particularly when considered in connection with the accompanying drawings, in which:

Fig. 1 is a side elevation of an assembly embodying the present improvements;

Fig. 2 is a median section through the scroll housing taken in a plane transverse to the wheel axis but with wheel removed, Fig. 2 being taken along line 2—2 of Fig. 3;

Figure 4:
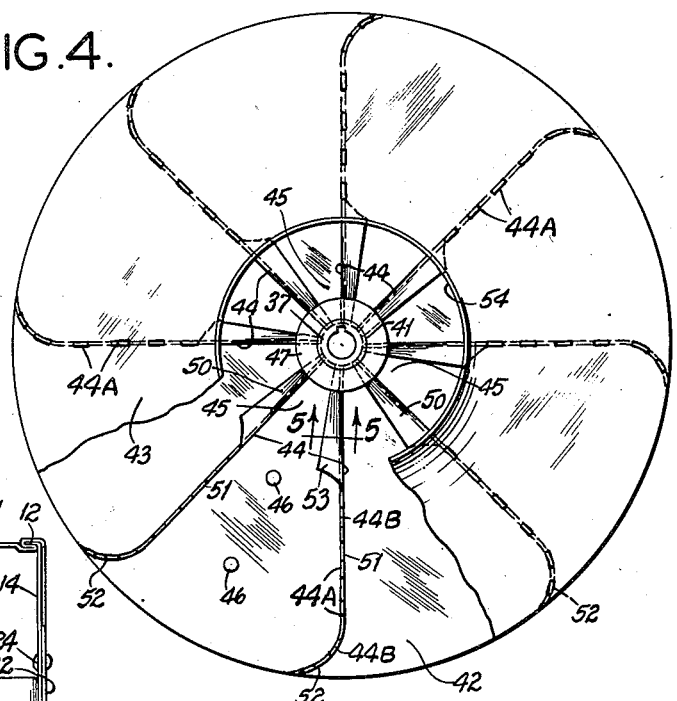
Fig. 4 is a side elevation of the blower wheel as viewed from the inlet side thereof, and partly broken away to show internal construction.

Referring now by characters of reference to the drawings, the scroll housing, generally indicated at 10, is by preference for minimization of weight, formed of sheet metal, and comprises a peripheral, rim or scroll portion 11, to the opposite margins of which are crimped as by a special "Pittsburgh lock" joint, indicated at 12, a pair of permanent side members 13 on the inlet side, and 14 on the opposite or rear side of the housing. Each of the opposite side plates 13 and 14 is provided with circular openings 15 and 16, both openings being preferably circular and of identical diameter. There is provided just outwardly of each of the openings 15 and 16, a circular row or annular series of rivet or bolt openings 17, these being identical in radial an angular spacing on opposite sides of the housing, for interchangeability, as will hereinafter better appear.

Occupying the openings 15 and 16 respectively are a pair of cylindrical inset or insert elements, one designated at 20 on the inlet side of the housing, and another at 21 on the opposite or back side thereof. The inset elements 20 and 21 are preferably identical so as to enable in assembly, utilizing either thereof at either side of the scroll housing in order to adapt the housing to different installation requirements, and to enable relatively reverse arrangements of inlet and outlet, as will readily appear. Further to describe the two inset elements 20 and 21, each comprises a cylindrical body or rim portion, these being assembled to adjacent flange elements 22 through crimped joints similar to the joints 12 heretofore referred to. The elements 22 are extended outwardly of the housing and provided with rivet or bolt openings 23 which conform in size and locations with the openings 17 in the side members of the housing, so that, now obviously, the openings 17 and 23 are in register in assembly and serve to receive an annular series of rivets or other securement elements 24.

Figure 3:
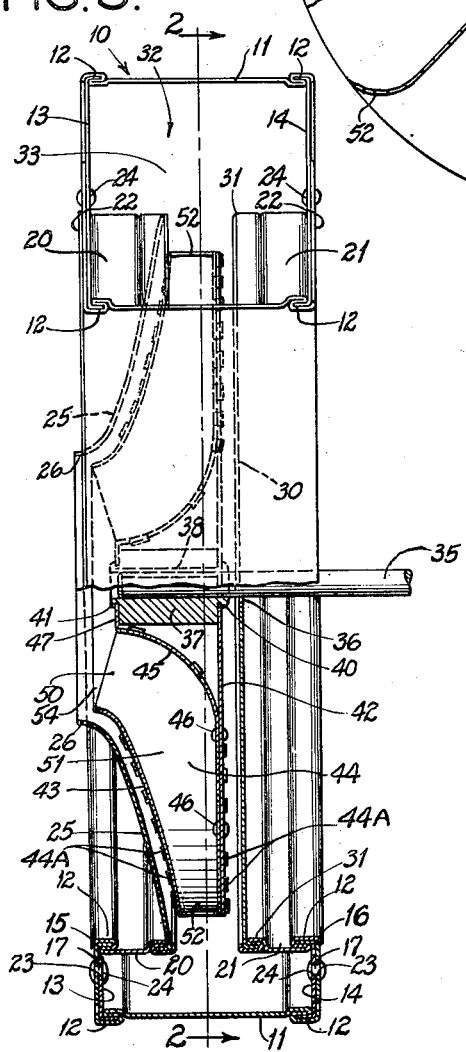
Fig. 3 is a sectional view, partly in elevation, of the assembly as viewed from line 3—3 of Fig. 1.
Figure 5:
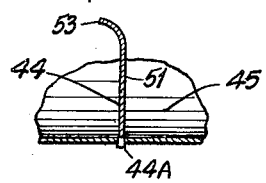
Fig. 5 is a sectional view along line 5—5 of Fig. 4.

A departure from the otherwise true identity of elements 20 and 21 is found in the provision of a flared or dished inner plate member 25 provided with an inlet eye or circular opening 26, fastened to the inset 20. As will readily appear from the section of Fig. 3, the irregular sectional curvature of member 25 conforms substantially and lies closely parallel to a similarly shaped shroud element (hereinafter referred to) in the wheel. It may be noted that both these elements, while curved in section are, in general shaping, of substantially frusto-conical form. In element 21 there is provided a substantially planar plate portion 30 which, similarly to the member 25 of inset 20 as shown, constitutes an extension of the rim portion of inset 21. A crimped joint 31 serves to complete the assembly of this element to its inset 21 and its outer flange, which through rivets 24, assembles the backplate structure to the body of the scroll housing proper.

It will be noted as an intended departure from prevailing practice, that the described construction of the scroll housing provides peripherally of the wheel (later to be described in detail) an expansion chamber 32, and it will now have appeared that in form, the scroll is so contoured as to result in what is known in the trade as a "tight" housing, i. e. one in which the major part of the scroll lies relatively close to the periphery of the wheel, although logically diverges radially therefrom, in approaching the housing outlet neck or duct generally indicated at 33 (Figs. 1 and 2).

It is further important to note that because of the required characteristics of most aircraft blowers, a high velocity, high pressure wheel may be employed which is relatively narrow in its axial dimension particularly in the peripheral zone in which fluid is discharged from the wheel. To give one example of the disparity in axial dimensions of wheel periphery and housing, one such wheel heretofore manufactured is but one-fourth inch wide at the outlet tip while the enclosing housing or scroll is required to connect with a two and one-half inch outlet duct. Thus it will appear that the housing outlet of the wheel is, in this typical case, only one-tenth of the housing width, thus rendering desirable not only for physical reasons of connection, but also for reasons of performance, a substantially lateral expansion of the wheel-discharged fluid within the housing proper. The facility for this result will be at once apparent from noting the proportions of width of wheel tip to that of chamber 32 in Fig. 3. It will also appear in this particular construction, that there are provided, particularly in and close to the outlet or discharge zone 33, provisions for a substantial degree of radial expansion as well as the axial expansion before noted.

While it will now have appeared obvious that otherwise conventional forms of scroll housing might be especially constructed of tapering peripheral width toward the discharge zone, it is nevertheless much more practical in production to construct the housing of uniform overall width, and to provide for the aforesaid axial expansion through the provision of the insets such as 20 and 21. This results in many advantages, particularly a lower cost in housing production, but also in the advantage of being able to adapt, by the use of insets of differing depth and diameter or either, otherwise more or less standardized scroll housings, to different wheels, and vice versa.

The maximum efficiency and performance of the assembly are attained in large measure through the design of scroll housing as heretofore described by way of example, but are due also in major part to an improved wheel design now to be described.

It is noted for completeness that the wheel is or may be rotatively supported on and powered by a shaft 35 which extends through a suitable opening 36 in the plate 30, and to which is angularly and axially secured a wheel hub 37. This securement may be effected in any conventional manner as by a Woodruff key 38, a shoulder or collar 40 and a collar or upset portion 41, the latter at the outer extremity of the shaft.

The wheel is formed of a substantially planar backplate or shroud 42 and an irregularly curved foreplate or shroud 43, the shroud plates 42 and 43 being bridged by the individual blades 44. The latter, as to active blade surfaces, are of tapering width as will be apparent from the showing of Fig. 3, being widest near the inlet portion of the wheel, thence tapering to a minimum width toward the periphery of the wheel. The number of blades is optional, but is shown as eight according to the example of Figs. 3 and 4. In construction, each of the several blades may be formed of a generally angular shape in transverse section, and secured in any suitable manner to the shrouds 42 and 43, and also to a somewhat frusto-conical shaped element. A highly practical and preferred manner of securement of the blades 44 to adjacent elements, consists in "staking" the blades to the adjacent members as by tongues 44A, which extend through slots 44B. As shown, the tongues are bent to lie flat against the opposite faces of the slotted members. This mode of securement obviates any difficulty of access, for assembly, to the spaces within the wheel. The element 45 is secured to the backplate 42 in the region of its larger diameter, as by a plurality of rivets 46 from which zone the element 45 sweeps inwardly and forwardly to the inlet zone of the wheel adjacent the hub 37. Adjacent the inlet end of the hub, the member 45 is provided with an annular flange 47 which may be secured to the hub as by welding, or by preference, by swaging or spinning over the hub portion 41 to overlie the innermost circular margin of the flange 47. The provision and shaping of the member 45, as will now have become apparent from Fig. 3, serves not only the purpose of bracing the inner extremities of the several blades, but coacts with the backplate 42 in providing a quasi-triangular, truss or bracing section of the wheel from the region near the hub, to a zone substantially outwardly thereof. This feature of construction, particularly in a light weight sheet metal wheel, has proven to be of particular value in high speed, high pressure wheel assemblies for use on aircraft, wherein, by reason of banks and turns of the aircraft, the wheel is subjected to severe gyroscopic stresses. The construction noted serves entirely adequately, without appreciable increase in weight, to maintain the alignment of the wheel, prevent any locking thereof, and assuring its normal relation at all times both to the shaft 35 and to the parts of the scroll housing.

Further in respect to the construction of blades as such, it may be noted that throughout the greater part of the length of each blade, its active area is substantially of radial trend. From this it results that the air passages intervening the blades, and formed by the blades and shroud plates, are similarly of substantially radial trend. An important departure from this is however to be noted in the particular formation given the blade tip portions. These are curved on a reasonable radius in a direction forwardly of the radial body of each blade, so that in the rotation (clockwise as viewed in Fig. 4), the blade tip leads the body of the blade.

Experiments have shown that in case the blades are of true or approximately radial trend throughout, the stream of air or like fluid leaves the wheel at an angle approximately 45 degrees from a tangent, and thus impinges rather abruptly against the surrounding scroll. The present provision of a sharp, forward curvature of the blade tips, serves to impart more of a forward directioning to the stream, as a result of which the stream leaves the wheel tip at an angle of the order of 30 degrees to a tangent, thus engaging the scroll in a more glancing manner, and with less of the otherwise abrupt impact. The combination utilized in the present example, of a long radial blade to impart to the fluid a substantial centrifugal component, and the curvature imparted to the relatively small outer or tip portion of the blade, results in an increased rotational component which resolves into a high resultant air velocity.

The efficiency of the wheel and of the wheel-housing assembly is further enhanced according to present design, by the provision, in the wheel, of what may be referred to as air inlet scoops. These are designated generally by numeral 50, Figs. 1 and 4, the radial or body portion of each of the blades 44, being designated at 51 and the described outer tip portion of each blade designated by numeral 52.

The formation of the inlet end of each of the blades 44 will be apparent from the drawings, but it may be further noted that in actual construction the edge of the inlet portion of each blade is formed around a cylindrical mandrel parallel with the back of the wheel, and is so sheared as to result in a leading margin at the proper angle at the full diameter of the inlet. A straight line cut is made, from a calculated outer point, to the center of the wheel, passing through the heel of the blade. It will be noted that the edge 53 of each of the blade inlet portions is located at a slight angle to the plane of the body 51, being the active blade surface. The angle, usually substantially as illustrated, may be readily determined on a basis of requirements of each wheel. Assuming the area of the wheel inlet eye or opening 54 to correspond to the area of inlet duct provided, and assuming a requirement of air flow to be given in cubic feet per minute, and supposing a uniformity of flow over the wheel inlet area, the velocity in lineal feet per minute into the inlet is readily calculated. This is laid off as a vector, and the peripheral velocity at several points across the inlet are laid at right angles to it. The resultant vectors indicate the angle of the inlet vanes at their respective radii, and in practice it has been found that the described formation of the inlet edge of the blade, particularly the scoop portion, resulted in substantially the calculated angle.

It is known that in certain fluid displacement devices some of the individual features of the wheel herein described, have been utilized. As far as is known however, the present design is the first to embody both the portions 50 in the inlet zone of the wheel and the forwardly curved blade tip portions 52, in combination. Experiments and performance of numerous wheels tested indicates a superior kind and degree of performance and efficiency when utilizing this combination of features.

With further reference to the general assembly, including both wheel and housing, it has been noted as entirely possible to expand the discharged stream of air or other fluid entirely in one direction from the periphery of the wheel. However, a distinct superiority in performance results from the use of a particularly narrow-outlet wheel, and a necessarily much wider scroll housing, when the wheel is disposed in a centered position or some other axially intermediate location within the housing. As in the example heretofore described, wherein the wheel is only one-tenth of the housing width, the centered position of the wheel results in a movement of the laterally expanded fluid stream through only one-half the distance prevailing in case the wheel were located entirely against the backplate of the housing. The centered position of wheel has been found accordingly to result in better performance and efficiency.

It will now have appeared that the novel construction of housing and the novel construction of wheel as described, serve individually, but more pronouncedly in combination to attain the several advantages and objectives specifically referred to, and others which will now be implied and apparent from the description, Although the invention has been described by making detailed reference to a particular operative assembly, the detail of description is to be understood solely in an instructive rather than a limiting sense in view of the numerous possibilities for variations in the parts and their combinations within the scope of the claims hereunto appended.

I claim as my invention:

1. In a blower assembly, a blower wheel of light-weight, shrouded type, a scroll housing formed of sheet metal and substantially enclosing the wheel, the wheel being of substantially lesser axial dimension in its peripheral portion, than the normal width of the housing, the housing including a perimetral scroll strip and a pair of side plates crimped into securement with the strip along the side margins thereof so as to provide a multiple-fold lock seam extended continuously along the lateral margins of the housing, providing a stiffening reinforcement therealong, a pair of inset housing members, one at each side of the blower wheel, and extended inwardly of each side of the housing, each said inset member including a cylindrical rim and a flange, the flange being crimped into engagement with the rim through a multiple-fold lock seam, and the flange of each inset being provided with holding members engaging the side walls of the housing.

2. In a centrifugal blower wheel of light weight, shrouded type, a plurality of blades, each elongate in a radial direction, a back plate, a foreplate spaced from the back plate, a dished plate between the fore plate and back plate, each of the blades being provided along its opposite side margins with a series of tongues, and a pair of the plates being provided with apertures adapted to register with and receive the tongues, the blades being staked into assembly with the plates through interengagement of the tongues and apertures.

3. In a blower assembly, a blower wheel of light weight, shrouded type, a scroll housing formed of sheet metal and enclosing the wheel, the wheel being of substantially lesser axial dimension in its peripheral portion, than the normal width of the housing, the housing including a perimetral scroll strip and a pair of side plates crimped into securement with the scroll strip along the side margins thereof so as to provide a multiple-fold lock seam extended continuously along the lateral margins of the housing and providing a stiffening reinforcement therealong, a pair of inset housing members, one at each side of the blower wheel, and extended inwardly of each side of the housing, each inset member including a cylindrical rim and a flange crimped into engagement with the rim through a multiple-fold lock seam, the flange extending outwardly of the last said seam in a direction substantially radially of the housing, and lying parallel to and along the adjacent side plate of the housing, each inset further including a plate member conforming in shape to and lying closely along the adjacent shroud element of the blower wheel, and holding members engaging the flange of each inset and extending through the side walls of the housing for assembly of the insets to the housing side walls.

4. The combination and arrangement of a blower wheel and the elements of the sheet metal scroll housing as recited in claim 3, but further characterized in that the plate member of the inset at the inlet side of the blower assembly is of dished or curved aspect, and is provided with a relatively large housing inlet eye, and the plate member of the inset on the opposite side of the housing is of substantially planar aspect, being provided with a central shaft opening but otherwise imperforate, and in which the cylindrical rim of each inset member is of slightly greater diameter than the blower wheel.

5. In a blower assembly, a blower wheel of light weight shrouded type, a scroll housing formed of sheet metal and enclosing the wheel, the wheel being of substantially lesser axial dimension in its peripheral portion than the width of the housing in the zone about the periphery of the wheel, the housing including a perimetral scroll strip, a pair of side plates, a multi-fold lock seam providing a stiffening reinforcement along each side margin of the scroll strip and serving to unite said strip to the adjacent side plate, a pair of inset housing members, one at each side of the blower wheel, and extended inwardly of each side of the housing, each said inset member including a cylindrical rim, an attachment flange extended outwardly of the rim and parallel to the adjacent side wall, the flange being crimped into engagement with the rim by a multi-fold lock seam, holding members extended through the flange of each inset and the adjacent side wall of the housing, the inset housing member at the inlet side of the blower assembly further including a plate member crimped through a multi-fold lock seam to the cylindrical rim thereof, and dished with gradual curvature from a large inlet eye, thence outwardly away from the axis of the housing, the inset member at the opposite side of the housing being provided with a central plate portion of substantially planar aspect crimped through a multi-fold lock seam to the cylindrical rim of the inset, the cylindrical rim of both insets being of appreciably greater diameter than the diameter of the wheel, and the width of the wheel in an axial direction, being a small fractional portion of the width of the housing just beyond the wheel, and outwardly of the inset members, whereby to provide for both axial and radial expansion in the region outwardly of the wheel.

6. In a centrifugal blower wheel of light weight shrouded type, a plurality of blades, each relatively elongate in a radial direction, a back plate, a fore plate spaced from the back plate, a dished plate which is of a generally frusto-conical section, disposed between the fore plate and the back plate, each of the blades being provided along its opposite side margins with a series of tongues, the fore plate and the dished plate each being provided with a series of apertures so arranged and of an area to receive and be occupied by the blade tongues, and the blades being staked into assembly with the aforesaid apertured plates through interengagement of the tongues and apertures.

7. In a centrifugal blower wheel of light weight shrouded type, a plurality of blades each elongate in a radial direction, each of substantially tapered width from a zone near the inlet portion of the wheel toward its periphery, a back plate, a fore plate spaced from the back plate, a dished plate between the fore plate and back plate, each of the plates being provided with a plurality of rows of closely arranged apertures and each of the blades being provided along its opposite side margins with a series of tongues, the tongues on one side of each blade extending through a series of apertures therefor in the fore plate and the tongues on the opposite side of each blade extended through correspondingly arranged apertures therefor in both the dished plate and the back plate, a shaft, a hub secured to the shaft and the dished plate being provided with an inturned, apertured flange adjacent one end of the hub and a portion of the hub being deformed into gripping engagement with adjacent areas of said flange.

EDMOND BRYAN WILLIAMS.